No. 678,679. Patented July 16, 1901.
R. S. McINTYRE.
TREE PROP BRACKET.
(Application filed Feb. 18, 1901.)
(No Model.)
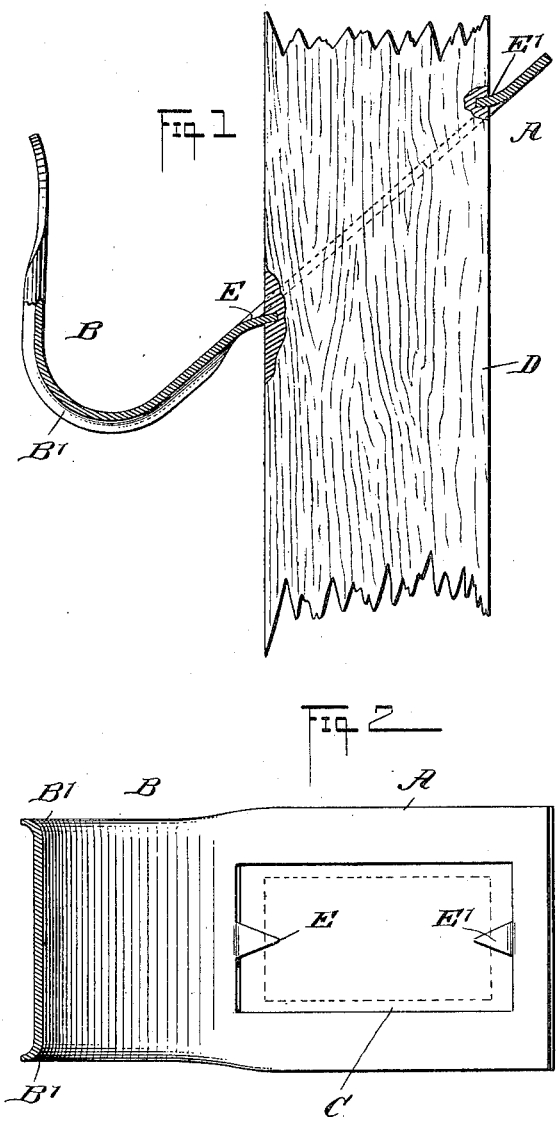
WITNESSES:
INVENTOR
Robert S. McIntyre
BY
ATTORNEYS

United States Patent Office.

ROBERT SAFFORD McINTYRE, OF RIVERSIDE, CALIFORNIA.

TREE-PROP BRACKET.

SPECIFICATION forming part of Letters Patent No. 678,679, dated July 16, 1901.

Application filed February 18, 1901. Serial No. 47,768. (No model.)

*To all whom it may concern:*

Be it known that I, ROBERT SAFFORD MCINTYRE, a citizen of the United States, and a resident of Riverside, in the county of Riverside and State of California, have invented a new and Improved Tree-Prop Bracket, of which the following is a full, clear, and exact description.

The object of the invention is to provide a new and improved tree-prop bracket which is simple and durable in construction, arranged for removable attachment to a supporting-post at any desired point thereof, and adapted to properly engage and securely hold a branch of a tree.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a sectional side elevation of the improved bracket in position on a post, and Fig. 2 is a plan view of the bracket.

The improved tree-prop bracket is made from a single piece of flat metal, and consists, essentially, of a shank A, terminating at its lower end in a hook B, adapted to engage a branch of a tree for the branch to rest in the hook. The hook has a wide flat bearing-surface for the branch approximately the width of the hook. The shank A is formed with an aperture C, preferably rectangular in shape, for the passage of a correspondingly-shaped post or bar D, preferably made of wood and adapted to rest on the ground.

On the shank A are formed points E E', located opposite each other and projecting into the aperture C, at the top and bottom portions thereof, to engage opposite sides of the post D, as is plainly shown in Fig. 1, to securely hold the bracket in position on the post at any desired point in the height thereof.

The upper point E is preferably bent upward, while the lower point E' is bent downward, so that the points extend about horizontally into the post D, as shown in Fig. 1, while the shank A is inclined to the post to permit the hook B to extend parallel with the post D and securely retain and hold the branch of a tree in position in the hook.

By having the points E E' engaging the post D at opposite sides they form trunnions for the bracket to swing relatively to the post, so that the bracket readily accommodates itself to the position of the branch of the tree it supports. Thus the branch readily rests in the hook the entire width thereof.

By making the hook of a considerable width a firm rest is provided for the branch without danger of cutting the bark. The bracket, and especially the hook thereof, is strengthened by bending the side edges B' downwardly, as is plainly shown in the drawings. Now when the branch of the tree rests in the hook its bark is not liable to be cut or chafed, as the turned-down edges present no sharp cutting edges to the bark.

Having thus fully described my invention, I claim as new and desire to secure by Letters Patent—

1. A tree-prop bracket, comprising a hook having a flat bearing-surface and a shank, the latter having an aperture for the passage of a supporting-post, and two oppositely-arranged points on said shank and extending into the aperture, the said points being adapted to engage the post at opposite sides to form trunnions for the bracket, whereby the latter can swing relatively to the post, for the purpose set forth.

2. A bracket of flat metal, comprising a hook having a flat bearing-surface and a shank, having an aperture for the passage of a supporting-post, and two oppositely-located points on the shank and projecting into the aperture at each end thereof, the points being located at or near the longitudinal center of the shank, the upper point being bent upward and the lower downward at an angle to the shank, and the points being adapted to engage the post at opposite sides and form trunnions for the bracket, as set forth.

3. The combination with a supporting-post, of a bracket having a shank through which extends the post, single points integral with the shank one at each end of the aperture and extending inwardly toward each other, and a hook integrally formed on the end of the shank and having a wide bearing-surface adapted to support the branch of a tree, the said points engaging the post at opposite sides, whereby the bracket can swing relatively to the post to accommodate itself to the position of the branch, as set forth.

4. A tree-prop bracket, comprising a shank having an aperture for the passage of a supporting-post, single points integral with the shank one at each end of the aperture and extending inwardly, the said points being adapted to engage the post at opposite sides to form trunnions for the bracket, and a hook at the end of the shank and approximately of the same width as the shank, the said hook having a wide flat bearing-surface for the branch, as set forth.

In testimony whereof I have signed my name to this specification in the presence of two subscribing witnesses.

ROBERT SAFFORD McINTYRE.

Witnesses:
WILLIAM K. GIBSON,
LAFAYETTE GILL.